W. H. MOZINGO.
SAW GUMMER AND SWAGER.
APPLICATION FILED AUG. 7, 1913.
1,095,662.
Patented May 5, 1914.
2 SHEETS—SHEET 1.
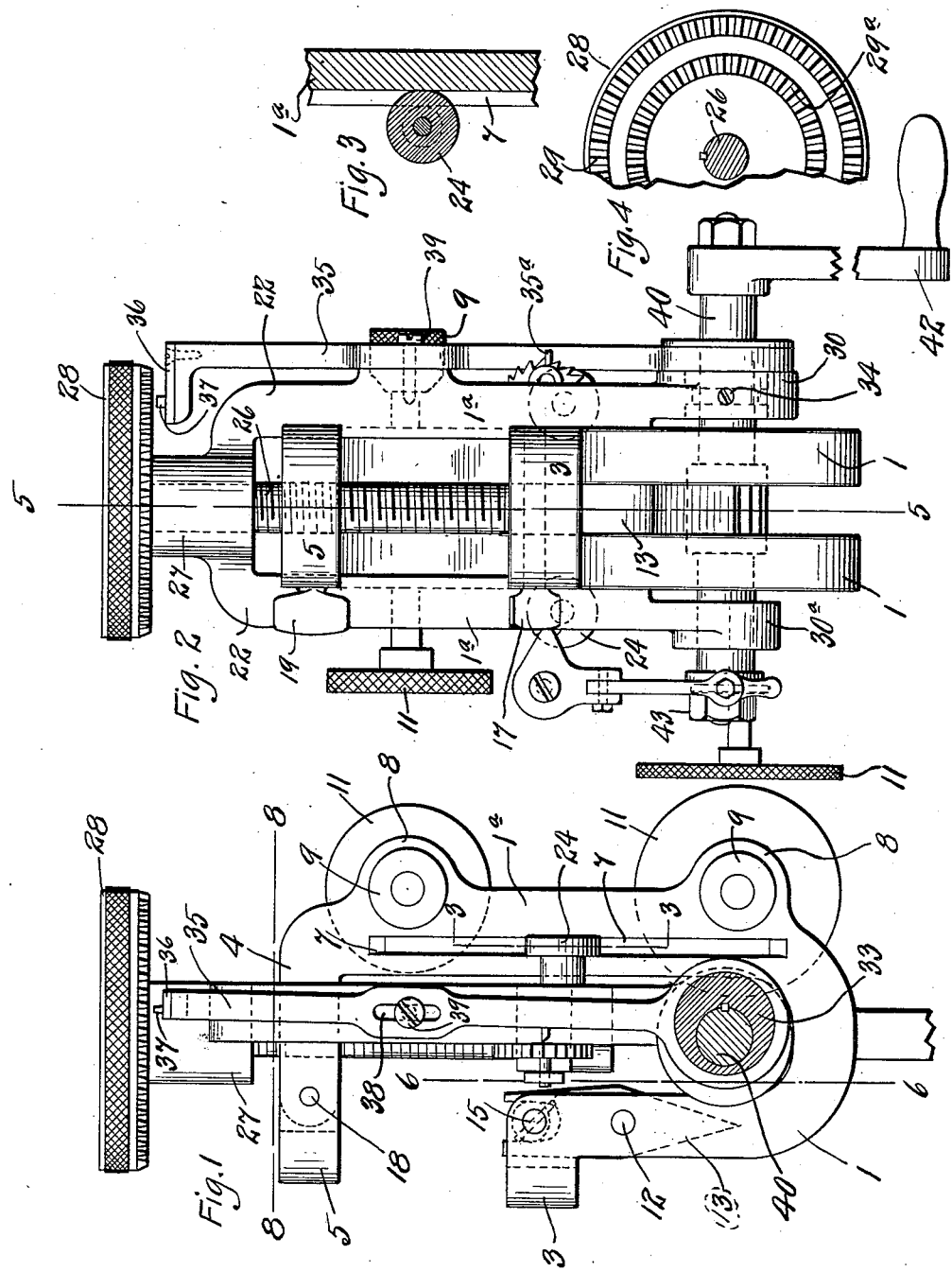
Witnesses
Inventor
William H. Mozingo
By ⸺⸺⸺ Att'y.

W. H. MOZINGO.
SAW GUMMER AND SWAGER.
APPLICATION FILED AUG. 7, 1913.
1,095,662.
Patented May 5, 1914.
2 SHEETS—SHEET 2.
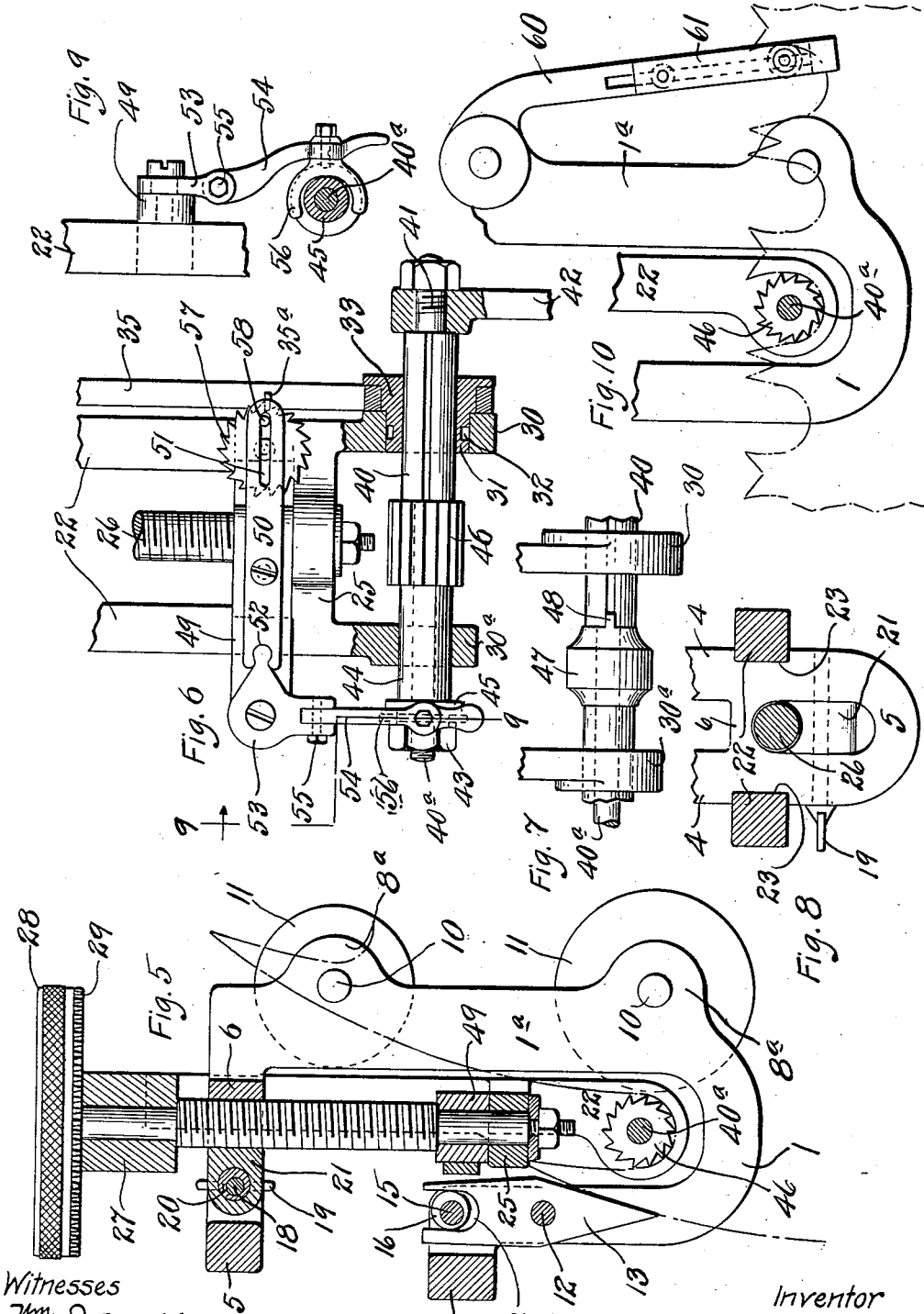
Witnesses
Wm. Jannus
W. C. Smith
Inventor
William H. Mozingo
By F. K. Cornwall.
Atty.

UNITED STATES PATENT OFFICE.

WILLIAM H. MOZINGO, OF HURDLAND, MISSOURI, ASSIGNOR OF ONE-HALF TO GEORGE M. HASHER, OF GIBBS, MISSOURI.

SAW GUMMER AND SWAGER.

1,095,662.  Specification of Letters Patent.  Patented May 5, 1914.

Application filed August 7, 1913. Serial No. 783,585.

*To all whom it may concern:*

Be it known that I, WILLIAM H. MOZINGO, a citizen of the United States, residing at Hurdland, Missouri, have invented a certain new and useful Improvement in Saw Gummers and Swagers, of which the following is a full, clear, and exact description, such as will enable others skilled in the art to which it appertains to make and use the same, reference being had to the accompanying drawings, forming part of this specification, in which—

Figure 1 is a side elevational view of a saw gummer and swager of my improved construction. Fig. 2 is a front elevational view of the combined tool. Fig. 3 is a vertical sectional view taken approximately on the line 3—3 of Fig. 1. Fig. 4 is an elevational view looking at the underside of a portion of the wheel which is mounted on one end of the main feed screw of the tool. Fig. 5 is a vertical section taken approximately on the line 5—5 of Fig. 2, and showing the position of a circular saw during the gumming operation. Fig. 6 is a detail section taken approximately on the line 6—6 of Fig. 1. Fig. 7 is a detail elevational view of a portion of the frame of the tool and showing the swaging roller in position on the main shaft of the tool. Fig. 8 is a horizontal sectional view taken approximately on the line 8—8 of Fig. 1. Fig. 9 is an elevational view partly in section, said view being taken approximately on the line 9—9 of Fig. 6. Fig. 10 is an elevational view of a part of the tool provided with an attachment which adapts the tool for use upon a crosscut saw.

My invention relates to improvements in saw gummers and swagers of the type shown in Patent No. 1,040,385, issued to me October 8, 1912, and the principal object of my present invention is to generally improve upon and simplify the construction of the combined gummer and swager in my patent aforesaid.

Further objects of my invention are to provide a gumming and swaging tool with a simple yet positive feeding means which has two speeds and which can be easily and quickly operated and regulated; to provide simple means for imparting longitudinal reciprocating movement to the gumming or swaging rollers simultaneously with their rotation, thereby evenly distributing the wear upon said gumming and swaging members; to provide a readily adjustable wedge or member which forms a guide or gage against which one of the saw teeth bears, in order to properly adjust the position of the tool upon a circular saw; to provide simple means whereby the gumming and swaging rollers or tools can be readily interchanged, and to provide means whereby the vertically moving frame which carries the gumming and swaging roll carrying shaft is held in a firm and substantial manner during its downward feeding movement upon the main frame of the tool.

With the above and other objects in view, my invention consists in certain novel features of construction, and arrangement of parts hereinafter more fully described and claimed.

The main frame of my improved device is preferably formed in a single piece and comprises a pair of substantially U-shaped members 1 and the legs 1ª on one side being substantially longer than the legs on the opposite side. The upper ends of the short pair of legs are united by a cross piece 3, and formed integral with the upper ends of the longer pair of legs and extending over the shorter legs are horizontally disposed members 4, the ends of which are united by a cross bar 5.

Formed integral with the ends of the members 4 near the points where they join with the upper ends of the legs 1ª is a transverse bar 6, one of the vertical faces of which is threaded. Formed in the outer faces of the legs 1ª are grooves 7 in which operate roller bearings hereinafter more fully described.

Formed on the rear side of one of the legs 1ª is a pair of rearwardly projecting bearings 8 in which are screw-seated thumb screws 9 and formed on the opposite one of the legs 1ª are corresponding bearings 8ª in which are screw-seated set screws 10 provided on their outer ends with hand wheels 11. The thumb screws 9 and set screws 10 provide means for clamping the frame 1 upon the saw when the device is in use.

Pivotally mounted upon a pin 12 which is seated in the short pair of legs of the frame is a substantially wedge shape gage or guide block 13, the inclined faces of which are for the purpose of serving as bearings for the outer faces of the teeth when the device is applied to a saw for the purpose of correct adjustment of said device, and the upper end of this block is provided with a slot or recess 14, said upper end occupying a position between the upper ends of the short legs and behind the transverse bar 3.

Journaled in the upper ends of the short legs of the main frame is a transverse shaft 15 and mounted thereon and occupying the notch or slot 14 is an eccentric disk 16. One end of the shaft 15 is provided with an operating handle or plate 17, and by engaging said plate or handle and rotating said shaft the position of the eccentric disk 16 is changed, thereby rocking the wedge block 13, and adjusting the inclination of the inner one of the inclined faces thereof.

Journaled in the horizontal arms 4 near the cross bar 5 is a shaft 18 provided on one end with an operating handle 19 and carried by said shaft between the arms 4 is an eccentric disk 20. This disk is positioned in a corresponding aperture formed in the block 21 which occupies a position between the arms 4, and one of the vertical faces of this block is threaded and occupies a position directly opposite the threaded face of the cross piece 6.

By rocking the shaft 18 and the eccentric disk carried thereby the block 21 can be reciprocated and moved toward or away from the cross bar 6. The yoke which carries the shaft on which the gumming and swaging tools are mounted comprises a pair of parallel legs 22 which occupy positions to the sides of the space between the legs of the main frame 1 and said legs 22 are seated in and arranged to slide through bearings 23 which are formed in the side faces of the arms 4.

Journaled on the lower portions and rear sides of the legs 22 are combined guide and bearing rollers 24 which traverse the grooves 7 as the yoke moves vertically relative to the main frame. Formed integral with the lower portions of the legs 22 is a cross bar 25 and journaled thereon is the lower end of a screw shaft 26, which latter passes upward between the threaded faces of the cross bar 6 and the block 21. The upper end of this screw shaft is reduced in diameter and is journaled in a bearing 27 which is formed integral with the upper ends of the legs 22. Fixed on the end of this shaft above the bearing 27 is a hand wheel 28 provided on its underside with two concentric rows of teeth 29 and 29ª.

The lower ends of the legs 22 are provided with bearings 30 and 30ª, and loosely mounted in the bearing 30 is a sleeve 31, the same being provided with an annular groove 32 and receives the inner end of a set screw 34 which latter is seated in the bearing 30. A portion of the sleeve 31 outside the bearing 30 is made eccentric as designated by 33 and loosely mounted on this eccentric portion is the lower end of a lever 35 which extends upward alongside of one of the legs 22 of the yoke. The upper end of this lever terminates immediately beneath the hand wheel 28 and adjustably positioned on said upper end is a plate 36 carrying a single tooth 37 which is adapted to engage with either of the sets of teeth 29 and 29ª.

Formed through the central portion of the lever 35 is a slot 38 and passing therethrough and seated in the corresponding leg 22 is a fulcrum pin 39.

The sleeve 31 has a key and slot connection with a shaft 40, one end of which is reduced in diameter as designated by 41 and detachably fixed on said reduced end is a crank handle 42. By this construction the sleeve 31 rotates with the shaft 40 and said last mentioned shaft is permitted to slide through the sleeve. The left hand portion of the shaft 40 is reduced in diameter as designated by 40ª and the outer end of this reduced portion is threaded and adapted to receive a lock nut 43. Mounted upon the reduced portion 40ª of the shaft 40 and operating in the bearing 30ª is a sleeve 44. Positioned between the end of this sleeve and the lock nut 43 is a grooved collar 45.

A gumming tool or cutter 46 is adapted to be positioned on the reduced portion 40ª of the shaft and this tool or cutter is clamped against a shoulder at the end of the shaft 40 by the sleeve 44 which latter is moved as the nut 43 is tightened on the end of the reduced portion of the shaft. When desired, the gumming roll or cutter 46 can be removed and a swaging roll 47, as shown in Fig. 7, substituted therefor. If desired, the swaging roll can be provided with a lug 48 which engages in one end of the groove in the shaft 40, thereby preventing said swaging roll from slipping during its action upon the teeth of the saw.

Loosely mounted on the lower end of the screw rod 26 and positioned immediately above the cross piece 25 is a bar 49 on which is fulcrumed a lever 50 provided at one end with a slot 51 and at its opposite end with a bearing 52. Fulcrumed on the outer end of this cross bar 49 is a bell crank 53, one of the arms of which engages in the bearing 52 and the opposite arm is bifurcated and receives one end of a lever 54. This lever is locked to the bell crank by means of a set screw 55 and loosely connected to the opposite end of this lever is a yoke 56 which engages in the grooved collar 45, previously described.

Journaled on the end of the cross bar 49 opposite the end on which the bell crank 53 is mounted is a ratchet wheel 57, from the face of which projects a pin 58, the same passing through the slot 51 in the lever 50.

Carried by the lever 35 is a single tooth 35ª which is adapted to engage the teeth of the ratchet wheel 57 during the reciprocating movement of said lever 35.

A tool of my improved construction, when in use, is applied to the edge of a circular saw and is clamped thereon by manipulating the hand wheels 11, thereby forcing the set screws against the saw and clamping the same against the inner ends of the thumb screws 9. The block 21 is withdrawn from the screw shaft 26 by engaging the handle 19 and rocking the shaft 18, and thus said shaft and the yoke carrying the gumming tool shaft can be quickly elevated and adjusted in position relative to the space or notch between the teeth of the saw. The block 21 is then forced into engagement with the screw shaft 26.

The block 13 is adjusted by manipulating the shaft 15 so that one of the inclined faces of said block forms a bearing for the outer face of one of the saw teeth, thus insuring the correct angle of the tool relative to the teeth of the saw.

Assuming that the gumming roll or cutter 46 is positioned on the shaft 40 and locked thereon by tightening the nut 43, the operator, in order to gum the saw or deepen the notch between the teeth thereof, manually engages the crank handle and rotates the shaft 40. Following such rotation the yoke and gumming roll are gradually lowered to permit said gumming roll to engage the saw, which lowering action is brought about by the intermittent rotation of the shaft 26.

The sleeve 31 rotates with the shaft 40 and the eccentric 33 operating in its bearing in the lower end of the lever 35 imparts reciprocating motion to said lever and as said lever is fulcrumed upon the pin 39 it vibrates simultaneously with its reciprocating movement. The tooth 37 on the plate 36 carried by the upper end of lever 35 engages the teeth of one of the annular racks on the underside of the hand wheel 28, and thus said hand wheel is rotated intermittently or step by stem. As a result of such movement, the shaft 26 is likewise intermittently rotated and as the threaded portion of said shaft engages the threaded faces of the cross piece 6 and block 21, said shaft will be gradually lowered or moved downward relative to the frame of the device, and likewise the yoke and parts carried thereby will be moved gradually downward. This movement causes the gumming roll 46 to engage between two of the teeth of the saw, and consequently the notch between the teeth will be gradually deepened. During such operation the gumming roll will be reciprocated lengthwise so as to evenly distribute the wear along the entire edges of all of the teeth of said gumming roll, said reciprocating movement being brought about as follows:

As the lever 35 is reciprocated the tooth 35ª thereon successively engages the teeth of the ratchet wheel 57, consequently imparting intermittent rotary movement to said ratchet wheel, and by reason of the pin and slot connection between said wheel and lever 50, the latter will be moved upon its fulcrum thereby actuating the bell crank 53 and swinging the free end of the lever 54 backward and forward. This lever 54 carries the yoke 56 which engages in the grooved collar 45 and as said collar is mounted on the reduced portion 40ª of the shaft 40 the latter and the parts carried thereby will be intermittently reciprocated simultaneously with their rotary movement. When it is desired to substitute the swaging roll for the gumming roll the nut 55 is loosened to permit the lever 54 to be swung outward and nut 43 is now removed from the end of the reduced portion of the shaft 40ª to permit the removal of the grooved collar 45, sleeve 44 and gumming roll 46.

In performing the swaging operation the eccentric disk 16 is shifted by a partial rotation of the shaft 15 so as to swing the lower portion of the block 13. The device is now adjusted on the point of one of the saw teeth so that said point is positioned between the swaging roll and the adjacent beveled face of the block 13. The shaft 40 is now rotated by manipulating the handle 42, and the surface of said swaging roll being upon the point of the tooth tends to flatten and spread the same, thereby effecting the swaging operation. During such operation, the block 13 performs the function of an anvil or bearing against which the point or end of the tooth engages when being swaged or flattened by the action of the swaging roll. During the vertical movement of the yoke relative to the frame of the machine the legs 22 bear in the notches 23 and the rollers 24 bear in the grooves 7, thereby holding the yoke firmly and guiding it accurately during its downward movement upon the frame.

The plate 36 can be readily adjusted upon the upper end of the lever so that the tooth 37 will engage with either set of teeth 29 and 29ª, and by such adjustment and by providing two sets or annular rows of teeth it is possible to vary the speed of the downward feed of the shaft 26 and the yoke.

In Fig. 10 I have shown an adjustable clamping member adapted to support the device when the same is in use upon a cross cut saw. This support comprises an arm 60, the upper end of which is engaged between the upper thumb screw 39 and upper set screw 10, and the lower portion of said arm carries an adjustable clamping member 61 which is adapted to engage the edge of a cross cut saw when the device is positioned for operation thereon.

A combined gumming and swaging tool of my improved construction is very compact, is composed of but few parts, and, therefore, is not liable to easily get out of order, can be easily applied to a saw and adjusted to proper position thereupon, and possesses superior advantages in point of simplicity, durability and general efficiency.

It will be readily understood that minor changes in the size, form and construction of the various parts of my improved tool can be made and substituted for those herein shown and described, without departing from the spirit of my invention, the scope of which is set forth in the appended claims.

I claim:

1. In a device of the class described, a frame adapted to straddle the cutting edge of a saw, a yoke slidably mounted in said frame, a shaft rotatably mounted in said yoke, a feed screw for imparting movement to the yoke, a disk on the upper end of said feed screw, which disk is provided with concentric annular rows of teeth, a tool removably carried by the shaft, a lever fulcrumed on the yoke and operably connected to the shaft, to receive a reciprocating movement therefrom, and an adjustable member on the upper end of the shaft for engaging one of the annular rows of teeth for imparting movement to the feed screw.

2. In a device of the class described, a frame adapted to straddle the cutting edge of a saw, a yoke slidably mounted in said frame, a shaft rotatably mounted in the yoke, a tool carried by said shaft, a feed screw for imparting movement to the yoke, and shaft carried thereby, a lever fulcrumed on the yoke and actuated by the shaft for imparting intermittent rotary movement to the feed screw, and means mounted on the yoke and actuated by said lever for imparting reciprocating movement to the shaft as the saw is rotated.

3. In a device of the class described, a frame adapted to straddle the cutting edge of a saw, a yoke slidably mounted in said frame, a shaft rotatably mounted in said yoke, a feed screw for causing the yoke and carried parts to move downward on the frame, a tool removably positioned on the shaft, a wedge shape gage block pivotally mounted in the frame, and an eccentric engaging said wedge block for adjusting the position thereof.

4. In a device of the class described, a frame, a yoke slidably mounted on said frame, a shaft rotatably mounted in the yoke, a tool removably positioned on the shaft, a feed screw connected to the yoke, a lever operatively connected to the shaft for imparting intermittent movement to the feed screw, a bell crank pivoted on the yoke, an arm extending from said bell crank to the shaft, a fulcrumed lever connected to the bell crank, a ratchet wheel on the yoke, and having a pin and slot connection with the last mentioned lever, and means on the first mentioned lever for engaging the ratchet wheel to intermittently rotate the same and impart movement to the bell crank and the arm which engages the shaft.

In testimony whereof I hereunto affix my signature in the presence of two witnesses, this 4th day of August, 1913.

WILLIAM H. MOZINGO.

Witnesses:
RALPH R. CAMPBELL,
E. N. SPENCER.

---

Copies of this patent may be obtained for five cents each, by addressing the "Commissioner of Patents, Washington, D. C."